United States Patent
Fang et al.

(10) Patent No.: US 12,261,978 B1
(45) Date of Patent: Mar. 25, 2025

(54) DETECTING A LOOP LENGTH CHANGE IN A DIGITAL SUBSCRIBER LINE

(71) Applicant: BRITISH TELECOMMUNICATIONS PUBLIC LIMITED COMPANY, London (GB)

(72) Inventors: Feiyu Fang, London (GB); Lykourgos Kekempanos, London (GB); Daniel Gilks, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/848,778

(22) PCT Filed: Feb. 6, 2023

(86) PCT No.: PCT/EP2023/052881
§ 371 (c)(1),
(2) Date: Sep. 19, 2024

(87) PCT Pub. No.: WO2023/179953
PCT Pub. Date: Sep. 28, 2023

(30) Foreign Application Priority Data

Mar. 23, 2022 (GB) ..................................... 2204091

(51) Int. Cl.
*H04M 3/30* (2006.01)
*H04B 3/46* (2015.01)

(52) U.S. Cl.
CPC .............. *H04M 3/30* (2013.01); *H04B 3/46* (2013.01); *H04M 2201/14* (2013.01)

(58) Field of Classification Search
CPC ...... H04M 3/30; H04M 2201/14; H04M 1/24; H04M 2203/055; H04M 2203/056;
(Continued)

(56) References Cited

U.S. PATENT DOCUMENTS

| 8,385,510 | B2 | 2/2013 | Berg |
| 9,008,280 | B2 | 4/2015 | Drooghaag |

(Continued)

FOREIGN PATENT DOCUMENTS

| EP | 1905195 B1 | 4/2008 | |
| TW | I637610 B | 10/2018 | |
| WO | WO-2022268534 A1 * | 12/2022 | ............... H04B 3/46 |

OTHER PUBLICATIONS

International Search Report and Written Opinion of the ISA for PCT/EP2023/052881 mailed Apr. 19, 2023, 12 pages.

(Continued)

*Primary Examiner* — Sophia Vlahos
(74) *Attorney, Agent, or Firm* — Nixon & Vanderhye P.C.

(57) ABSTRACT

Presented is a method of detecting a loop length change in a digital subscriber line. An Uncalibrated Echo Response (UER) trace is obtained from the digital subscriber line by running a Single Ended Line Test (SELT). A historical (baseline) UER trace from the same line is retrieved. A line that has experienced a small change in loop length will have the same overall shape, but be compressed or stretched in the frequency domain. Thus, to detect such a change, a comparison between the two traces is made to determine if the difference between the two traces is less than a threshold but non-zero. Then a range of scale factors are applied in the frequency domain on either one of the traces, before determining which of the scale factors results in the lowest difference between the unscaled and scaled traces. The determined scale factor is above a certain threshold, then the line is determined to have had a loop length change. The value of the scale factor can be used to determine the amount the length has changed.

6 Claims, 7 Drawing Sheets

(58) Field of Classification Search
CPC ........ H04M 3/085; H04M 3/305; H04B 3/46; H04B 3/493; H04B 17/104; H04B 17/17; H04L 25/0222; G01R 31/11
See application file for complete search history.

(56) References Cited

U.S. PATENT DOCUMENTS

| | | | |
|---|---|---|---|
| 9,106,735 | B2 | 8/2015 | Rhee |
| 9,178,990 | B2 | 11/2015 | Dinesh |
| 2002/0114383 | A1* | 8/2002 | Belge ............... H04M 3/2227 375/222 |
| 2006/0120442 | A1* | 6/2006 | Melsa ................ H04B 3/493 375/222 |
| 2006/0251160 | A1 | 11/2006 | Fazlollahi et al. |
| 2008/0089485 | A1 | 4/2008 | Duvaut et al. |
| 2009/0310755 | A1 | 12/2009 | Dinesh |
| 2017/0180549 | A1 | 6/2017 | Zahedi |
| 2019/0044626 | A1* | 2/2019 | Hewavithana ...... H04L 25/0222 |

OTHER PUBLICATIONS

Combined Search Report and Examination Report for GB2204091.9 dated Aug. 26, 2022, 5 pages.
Nilsson, Management of a DSL copper network using built-in loop qualification tools, Master's degree project Stockholm, 86 pages, 2005.
Assia Inc., Advanced xDSL Line Testing and Fault Location for Service Providers, Oct. 2015.
Single-Ended Loop Testing (SELT) Expectations and Realities, Texas Instruments, SPAY011A—Mar. 2003 White Paper, 18 pages.
Single-Ended Line Testing for Digital Subscriber Lines (DSL), International Telecommunication Union, Series G: Transmission Systems and Media, Digital Systems and Networks Digital sections and digital line system—Metallic access networks, Recommendation ITU-T G.996.2, Dec. 2017, 22 pages.
International Preliminary Report on Patentability dated Oct. 3, 2024, issued for International Application No. PCT/EP2023/052881 (7 pages).

* cited by examiner

DETECTING A LOOP LENGTH CHANGE IN A DIGITAL SUBSCRIBER LINE

This application is the U.S. national phase of International Application No. PCT/EP2023/052881 filed Feb. 6, 2023, which designated the U.S. and claims priority to GB Patent Application No. 2204091.9 filed Mar. 23, 2022, the entire contents of each of which are hereby incorporated by reference.

FIELD OF THE INVENTION

This invention relates to a method of detecting a loop length change in a digital subscriber line.

BACKGROUND TO THE INVENTION

Digital subscriber line (DSL) technology, often referred to as "broadband", is a family of services that provides digital data transmission over the metallic twisted copper pairs that form part of a local telephone network. DSL is commonly used to provide a customer's home with a network connection, typically to the Internet via an ISP.

However, DSL lines may develop to faults, arising for example from faulty joints or interference. Various approaches have been used to identify and locate faults. For example, if a DSL line is synchronised and able to provide some level of service, then various DSL line parameters (e.g. SNR margin, line attenuation, bit error rates) can be measured and analysed to identify certain of fault. These in-sync measurements are typically made at the DSLAM (digital subscriber line access multiplexer). Diagnostic exchange tests can also be done by specialist line test equipment located at the central office, and include copper line tests in the electrical domain. These include measurements such as capacitances and resistances, which can also be analysed to help identify faults.

However, in very high speed DSL (VDSL) services, often referred to as "Fibre to the Cabinet", specialist line test equipment is generally not available, as the DSLAM for VDSL services is typically not located in an exchange, but instead in a primary connection point (PCP) such as a roadside cabinet, which may not have the physical capacity for such equipment, or such equipment may be prohibitively costly to install in the cabinet.

Furthermore, many of the measurements made by the DSLAM that are currently used to identify faults rely on a DSL line being initialised and synchronised. Therefore, certain faults such a physically disconnected line make it impossible for a line to initialise and synchronise, thus making such measurements impossible.

Single Ended Line Tests, SELTs, as set out in ITU-T G.996.2, can be used to identify VDSL line conditions without the need for connectivity to the exchange or line sync, as they are based on a single sided test signal launched directly from the DSLAM line driver. SELT techniques typically use frequency domain UER (uncalibrated echo response) traces obtained from a frequency sweep over the VDSL spectrum, which reflects from the end of the line and results in a per-tone interference pattern detected at the DSLAM modem.

SELT UER are highly sensitive to changes in the electrical state of the line, and so can be analysed to identify anomalous behaviour, and thus detect potential faults on a line. This can be done by performing comparisons between historical traces and a current trace to determine whether there may be a fault on the line. However, the sensitivity of SELT UER traces means that some detected changes are inconsequential, but might still be flagged as a fault condition, and lead to further unnecessary actions. One such condition is small changes in the loop length of a line due to changes of in-home wiring, such as a connection of a different DSL lead. It would therefore be useful to identify these cases where a new SELT UER result trace differs from the existing historical baseline trace due to a small loop length changes, where the physical cable has not fundamentally changed.

European patent EP1905195B1 describes methods, systems and apparatus for managing digital communications systems. More specifically, aspects described relate to estimating the configuration of one or more channels or lines in a communication system such as a DSL system.

"Management of a DSL copper network using built-in loop qualification tools", Martin Nilsson, KTH Stockholm, 2005, Masters Thesis, describes concepts including regular monitoring measurements on DSL lines instead of just measuring when something has gone wrong, measurements are to be performed periodically and the data collected in a database for further analysis. Suggestions are made on how data collected at different occasions and at different lines could be correlated to extract as much information as possible.

U.S. Pat. No. 10,051,117B2 describes determining a baseline of physical line characteristics for each of the DSL lines in a group; collecting current physical line characteristics for each of the DSL lines in the group; determining a physical line characteristics delta for each of the DSL lines in the group by comparing the current physical line characteristics to the baseline of physical line characteristics for each of the respective DSL lines; and indicating a defect in the common cable based on a quantity of the DSL lines in the group for which the respective DSL line's physical line characteristics delta exceeds a threshold.

SUMMARY OF THE INVENTION

According to one aspect of the present invention, there is provided a method of detecting a loop length change in a digital subscriber line, said method comprising:
- generating a test echo response from the digital subscriber line using a single ended line test, wherein said test echo response comprises a frequency domain trace;
- retrieving a historical echo response associated with the digital subscriber line, wherein the historical echo response comprises a frequency domain trace previously taken from the digital subscriber line;
- applying each of a plurality of scale factors to the frequency axis of the test echo response or to the frequency axis of the historical echo response to generate a corresponding plurality of adjusted test echo responses or adjusted historical echo responses respectively;
- calculating a difference between each of the adjusted test echo responses and the historical echo response or the adjusted historical test echo responses and the test echo response; and
- identifying the scale factor that resulted in the lowest calculated difference;
- comparing the identified scale factor to a threshold; and
- determining if there is a loop length change in dependence on the comparing step.

The method may further comprise performing interpolation on the scaled test echo response or the scaled historical echo response to generate an adjusted test echo response or adjusted historical echo response, wherein the adjusted response test echo response or adjusted historical echo response comprises data points corresponding to the data points of the unscaled echo response.

The method may further comprise determining an amount of the loop length change using the identified scale factor. The amount may be a percentage change. Or the amount may be a length change.

According to a further aspect of the invention, there is provided a test module for of detecting a loop length change in a digital subscriber line, said test module adapted in operation to:
- obtain a test echo response from the digital subscriber line using a single ended line test, wherein said test echo response comprises a frequency domain trace;
- retrieve a historical echo response associated with the digital subscriber line, wherein the historical echo response comprises a frequency domain trace previously taken from the digital subscriber line;
- apply each of a plurality of scale factors to the frequency axis of the test echo response or to the frequency axis of the historical echo response to generate a corresponding plurality of adjusted test echo responses or adjusted historical echo responses respectively;
- calculate a difference between each of the adjusted test echo responses and the historical echo response or the adjusted historical test echo responses and the test echo response; and
- identify the scale factor that resulted in the lowest calculated difference; compare the identified scale factor to a threshold; and
- determine if there is a loop length change in dependence on the comparing step.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention present a method of detecting a loop length change in a digital subscriber line. An Uncalibrated Echo Response (UER) trace is obtained from the digital subscriber line by running a Single Ended Line Test (SELT) on the line. The UER is a frequency domain response obtained from a frequency sweep over the VDSL spectrum, which reflects from the end of the line, and results in a per-tone interference pattern detected at the DSLAM modem. A historical (baseline) UER trace from the same line is retrieved. A line that has experienced a small change in loop length will have the same overall shape, but be compressed or stretched in the frequency domain. Thus, to detect such a change, a comparison between the two traces is made to determine if the difference between the two traces is less than a threshold but non-zero. Then a range of scale factors are applied in the frequency domain on either one of the traces, before determining which of the scale factors results in the lowest difference between the un-scaled and scaled traces. The determined scale factor is above a certain threshold, then the line is determined to have had a loop length change. The value of the scale factor can be used to determine the amount the length has changed.

Figure 1:
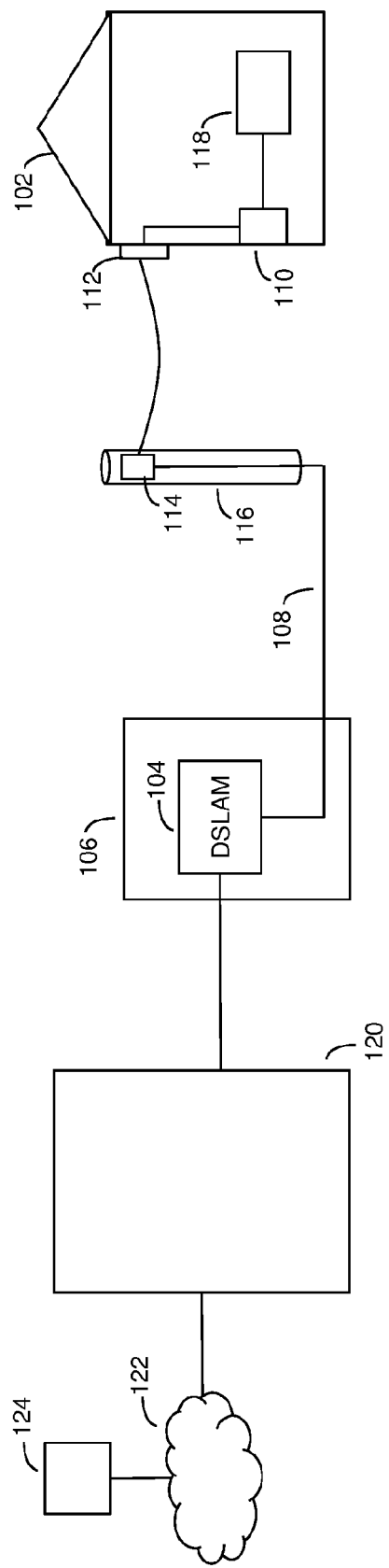
FIG. 1 is a system diagram showing a digital subscriber line running to a customer premises.

FIG. 1 is a simplified system diagram illustrating a telecommunications network 100 including a customer's premises 102. The customer's premises 102 is connected to a DSLAM 104 located at a primary connection point PCP 106, which is typically a roadside cabinet. The connection between the customer premises 102 and DSLAM 104 is provided by a telephone line 108, made of a pair of twisted copper or aluminium wires. Specifically, a network termination equipment NTE 110 is at the customer premises 102 end of the line 108. The NTE 110 is often referred to as a line box or master socket, and is the demarcation point between the telephone network and the customer wiring in the customer premises 102. The line 108 runs from the NTE 110 to a junction box 112, and then onto a distribution point DP 114. In this example, the DP 114 is located on a telephone pole 116. The line 106 then continues onto the PCP 106 and specifically the DSLAM 104. Within the customer premises 102, the NTE 110 is connected to customer premises equipment CPE 118, which is typically a router or home hub that includes a modem.

It is envisaged that the line 108 can experience a change in its loop length as a result of the customer changing the cabling for a different length cable between the NTE 110 and the CPE 118. For example, a customer may swap the cable for a longer one when moving the CPE 118 to a different location further from the NTE 110. In examples of the invention, there are presented methods to determine that such a change in the length of the line 108 has occurred, and can further determine the amount the line has changed in length. Note, the loop length of the line 108 is usually measured as the total length of the metallic pair running from the DSLAM 104 to the CPE 118.

A DSLAM is a network element that provides digital subscriber line (DSL) services to connected lines and associated customer premises. The line 108 is thus also referred to as digital subscriber line, or DSL line. In this example, the DSLAM 104 provides a VDSL service on the line 108. The DSLAM 104 also has an onward connection, typically a fibre optic connection, to the local exchange 120, and from there onto data provisioning networks 122 via suitable connections and equipment. The data provisioning networks may include the internet and other networks. A skilled person will appreciate that there are other elements in the network 100 that have been omitted for simplicity, such as elements that provide standard PSTN services to the line 108.

Also shown connected to the data provisioning network is a test module or test server 124. The test module 124 comprises a processor and a data store, such as hard disk array or similar. The test module 124 gathers data from the DSLAM 104, and the processor can use that data, together with other data, to determine if there is a change in the loop length of the line 108.

Whilst the present example shows a DSLAM residing in a PCP (roadside cabinet), the invention would still be applicable to configurations where the DSLAM is situated somewhere else. For example, the invention could still be applied to networks and services where the DSLAM is located in the local exchange 120.

Furthermore, FIG. 1 only shows a single line and associated elements. However, in practice there will be a number of lines, each serving a respective customer premises, connected to the DSLAM. Moreover, there will be many DSLAMs connected to the exchange, and nationally there will be many exchanges. Any number of these lines can be tested by the test server 124 using the methods described below.

Figure 2:
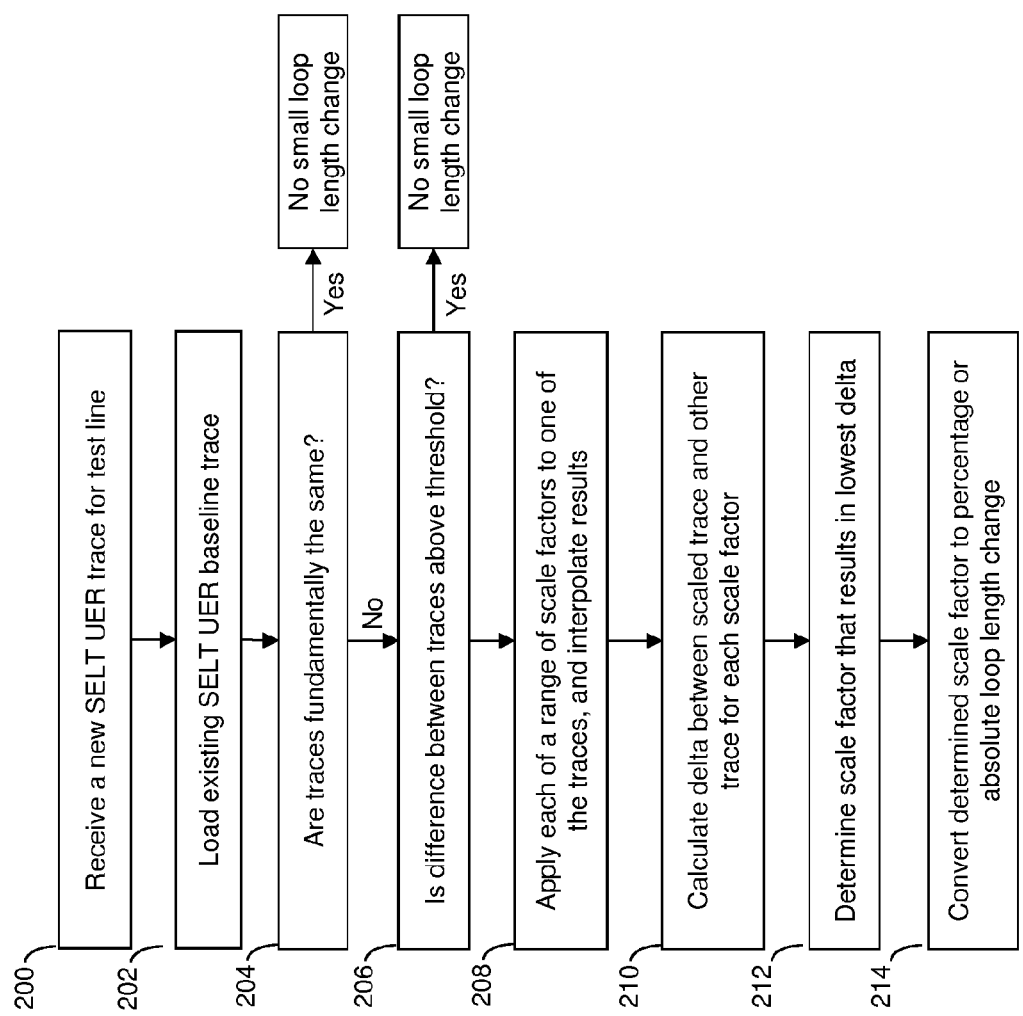
FIG. 2 is a flow chart summarising the steps of an example of the invention.

FIG. 2 is a flow chart summarising the steps of the present invention as performed by the test module 124.

In step 200, the test module 124 receives a SELT UER response (or test trace) for the test line 108. The SELT UER response is obtained from the DSLAM 104 by performing SELT measurements using a frequency sweep over the VDSL spectrum on the line. A more detailed discussion of the SELT standard can be found in the International Telecommunication Union recommendation G.996.2, "Single-ended line testing for digital subscriber lines". SELT measurements consist of sending wideband signals down a line, with the UER being the received signals reflected back from the line (over a frequency range).

SELTs can be run remotely and can run regardless of the line synchronisation condition, and when the line is faulty or undergoing repairs. In contrast, service layer tests require a line to be synchronised.

Figure 3:
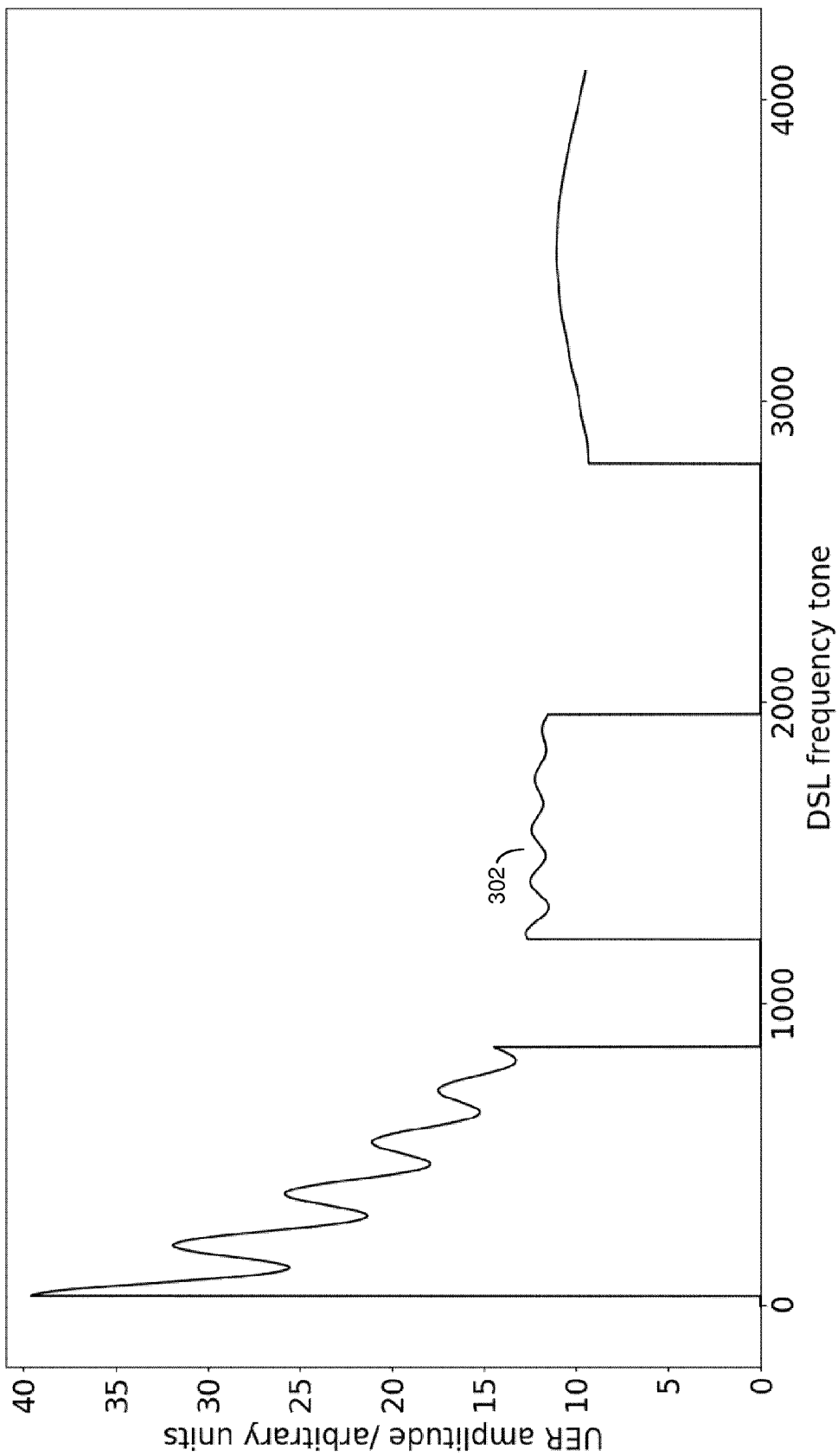
FIG. 3 is an example of a SELT UER.

The SELT UER comprises an array of complex values (at discrete tones or frequencies) representing the phase and amplitude of the reflected waves detected over the frequency range. This is encoded as two arrays, Real and Imaginary components and a data scaling factor. An example of a SELT UER trace illustrated in a graph of detected amplitude plotted against frequency tone (which ranges from 0 to 4095) as shown in plot 302 in FIG. 3.

In step 202, the test module 124 loads a baseline or historical SELT UER response associated with the line. The baseline SELT UER response is representative of what the response on the line should look like when in good working condition. One way in which to initially generate this baseline SELT UER response is by performing a number of SELTs over a period of time on the line. If these responses are fundamentally similar (i.e. largely the same shape), then it is assumed the line is in a stable good line condition, and a baseline response is generated from the responses—for example some average or weighted average of the responses. Note, if the responses differ significantly from each other, then no baseline is generated, and instead a potential fault might be diagnosed instead.

Figure 4:
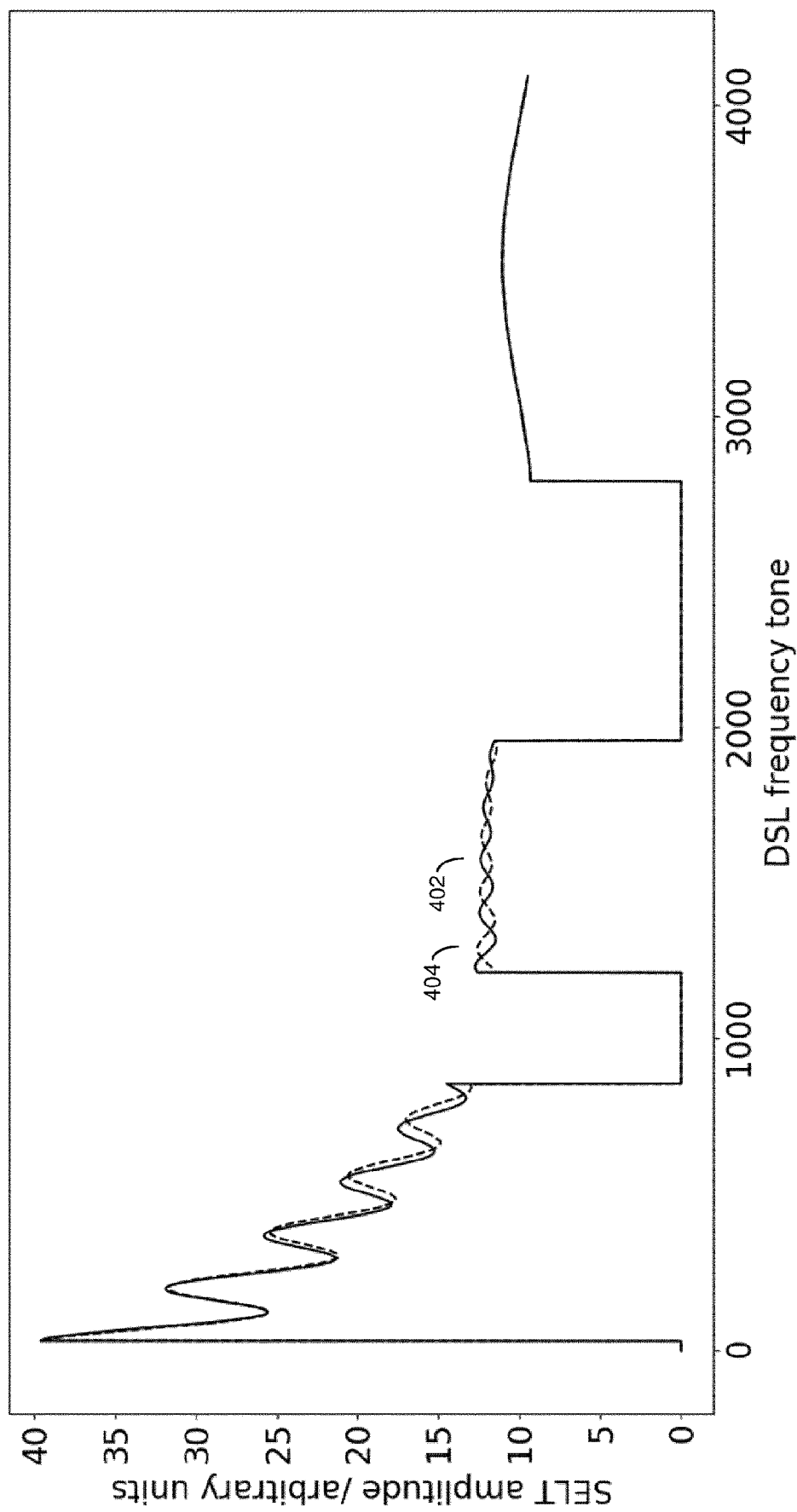
FIG. 4 is an example of a SELT UER test trace and SELT UER baseline trace.

FIG. 4 shows an example of a test trace and a baseline trace. The test trace is shown by the solid line of plot 402, and the baseline trace is shown by the solid line of plot 404. In this example, the test trace represents a longer line, and the baseline trace a shorter line. Thus, the line has undergone a small loop length change. Note, under a small loop length change, the overall coarse shape of the trace is unchanged, but the frequency oscillations at the lower frequencies are different and indicate a small loop length change. Harmonic features in the lower frequencies indicate the reflection from the end of the line, decreasing in amplitude with increasing frequency. Tighter harmonic oscillations with frequency indicate a longer line, and vice versa.

These harmonics are caused by standing waves formed by the interference between the outward and reflected signals, and so the width of the oscillations are very sensitive to the line length. The wider features of the trace may be caused by other factors such as cross-talk, which would remain the same even when a line has become slightly longer such as due to a change in home wiring. Thus, when a line becomes slightly longer or shorter, the overall coarse shape of the trace remains the same, while the fine oscillations in the lower frequencies become stretched or compressed along the frequency axis.

In step 204, the test module 124 checks to see if the baseline and test traces are fundamentally similar. This is to rule out cases where the line has not undergone any change in length, or indeed where the line is not suffering from any change in line condition. Note, this step is optional, or could be performed at a later point in the method.

The test can be done by calculating a delta Δ between the baseline trace and the test trace, where the delta is calculated as the sum of the squares of the differences between each tone value along the spectrum, as shown by equation (1) below:

$$\Delta = \Sigma_i (\text{Test}_i - \text{Baseline}_i)^2 \quad (1)$$

If the comparison results in a delta Δ=0 or near zero (or below some threshold near zero), then the traces are fundamentally the same, and processes passes to step 205, where the line is classified as not having a loop length change, and processing ends. Otherwise processing passes to step 206.

In step 206, the test module 124 checks to see if the delta Δ is above a certain threshold. This threshold is set to some non-zero value that helps filter any actual line conditions or faults that would result in the traces being significantly different. This upper threshold for delta Δ may be determine from examining trace data from lines that have known line conditions or faults.

If the result of step 206 is that there is a difference above the set threshold, then processing passes to step 207, where the line is classified as not having a small loop length change, and processing finishes. In practice, further tests can be conducted at this point to determine what line condition or fault might be present on the line.

If the difference is not above the threshold, then processing passes onto step 208.

In step 208, a scale factor $SF_n$ is defined. Application of the scale factor $SF_n$ to a trace will have the effect of either stretching (scale factor >1) or compressing (scale factor <1) the trace, as will be described below. A range for $SF_n$ is defined. In this example, $SF_n$=0.8 to 1.2 in steps of 0.01.

Then each $SF_n$ is applied to the test trace by multiplying the frequency axis by $SF_n$. Or more specifically, multiplying each tone/frequency for the data points that make up the trace by $SF_n$. In this example, there are 4096 discrete tones/frequencies that make up the trace. The result is a scaled test trace, with data points at new (scaled) frequencies.

Described another way, for each scale factor $SF_n$, the tone value X is scaled to $X_i'$, where:

$$X_i' = X_i \cdot SF_n \quad (2)$$

for all tones i=0 to 4095.

Thus, a new scaled trace is generated for each scale factor $SF_n$.

If the original points on the trace are represented by ($X_i$, $Y_i$), then the application of the scale factor to $X_i$ to generate $X_i'$ will mean that the values of $X_i'$ will be stretched beyond (or compressed short of) the original $X_i$ to a new point $(X_i', Y_i)$.

Figure 5:
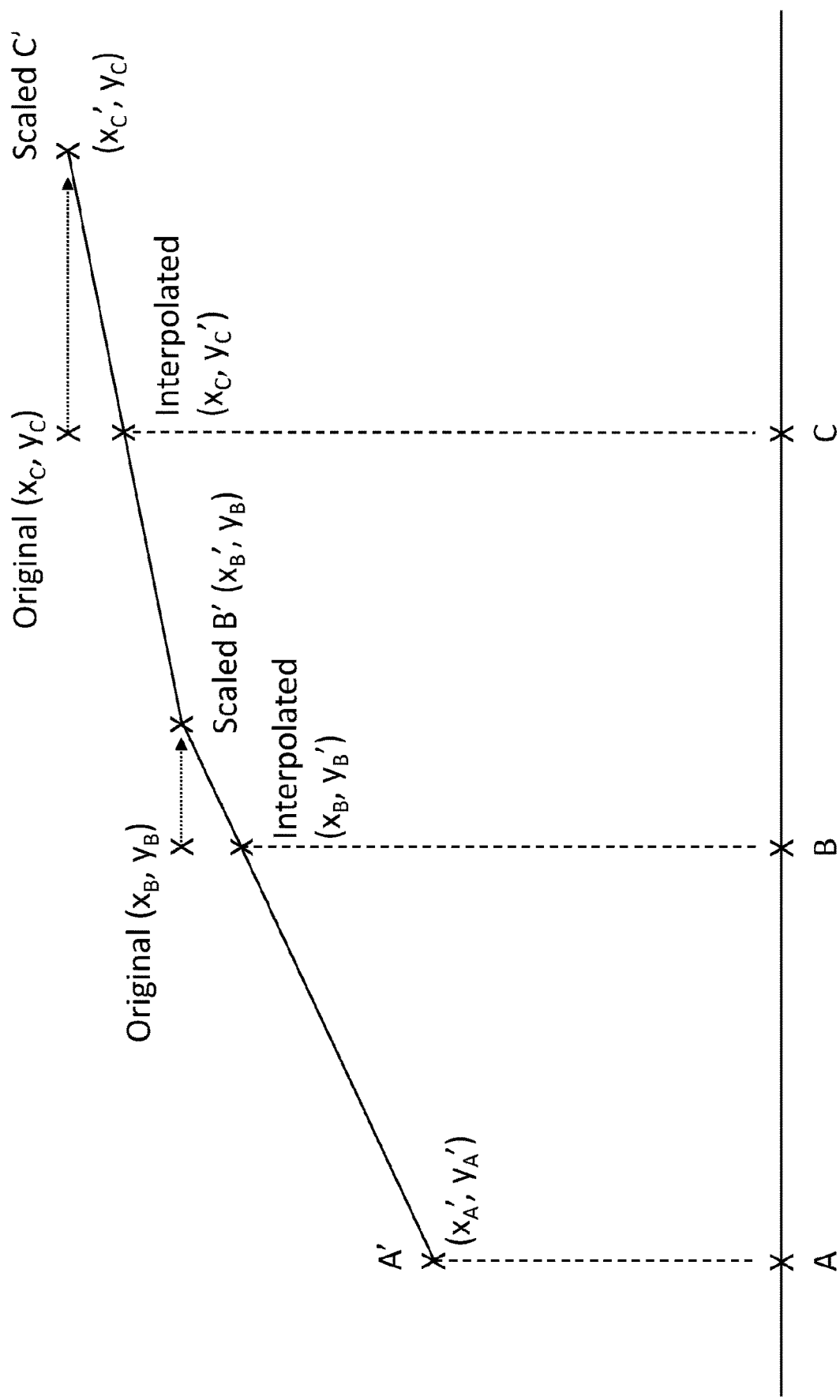
FIG. 5 shows a portion of a scaled UER trace.

To illustrate, reference is made to FIG. 5, which shows two of the original data points, $(X_B, Y_B)$ at tone B and $(X_C, Y_C)$ at tone C, and their respective scaled points $(X_B', Y_B)$ at tone B' and $(X_C', Y_C)$ at tone C'.

However, the scaled values of $X_i'$ are now not at the same tone as $X_i$, which means comparing the scaled (in this example test) trace with the unscaled (baseline) trace is challenging as the data points are not at the same tones. To address this, interpolation of the scaled data can be done to generate data points at the same tones as the unscaled trace.

There are many different ways in which interpolation can be done, but there now follows one example using linear interpolation.

We want to determine an interpolated value of Y' at location $(X_i, Y_i')$, where $X_i$ is the required tone. For example, referring to FIG. 5, original data point $(X_C, Y_C)$ is scaled to $(X_C', Y_C)$. However, we need to calculate the difference between the points at frequency of the tone C, so we will need to calculate the interpolated point $(X_C, Y_C')$. To do this, $Y_i'$ is interpolated at $x=X_i$ as a new y-axis value between $Y_{i-1}$ and $Y_i$ (or between $Y_i$ and $Y_{i+1}$ for compression, as the original $Y_i$ value has been compressed short of the $X_i$ frequency and so $Y_{i+1}$ is needed to interpolate the $Y_i'$ value).

The result of step 208 is a set of adjusted (scaled and interpolated) test traces, one corresponding to each of the scale factors $SF_n$ used.

Once the test trace has been scaled and interpolated, processing moves to step 210 where each of the adjusted test traces are compared to the baseline trace to calculate a corresponding delta $\Delta(SF_n)$, one for each scale factor. The same technique as described above with reference to equation (1) could be used, but instead we compare the adjusted test trace with the baseline trace as follows:

$$\Delta(SFn) = (\text{AdjustedTest}_i - \text{Baseline}_i)^2$$

Where AdjustedTest$_i$ is $Y_i'$, and Baseline$_i$ is $Y_i$, for all tones i=0 to 4095.

The result is a delta $\Delta$ for each scale factor $SF_n$.

Figure 6:
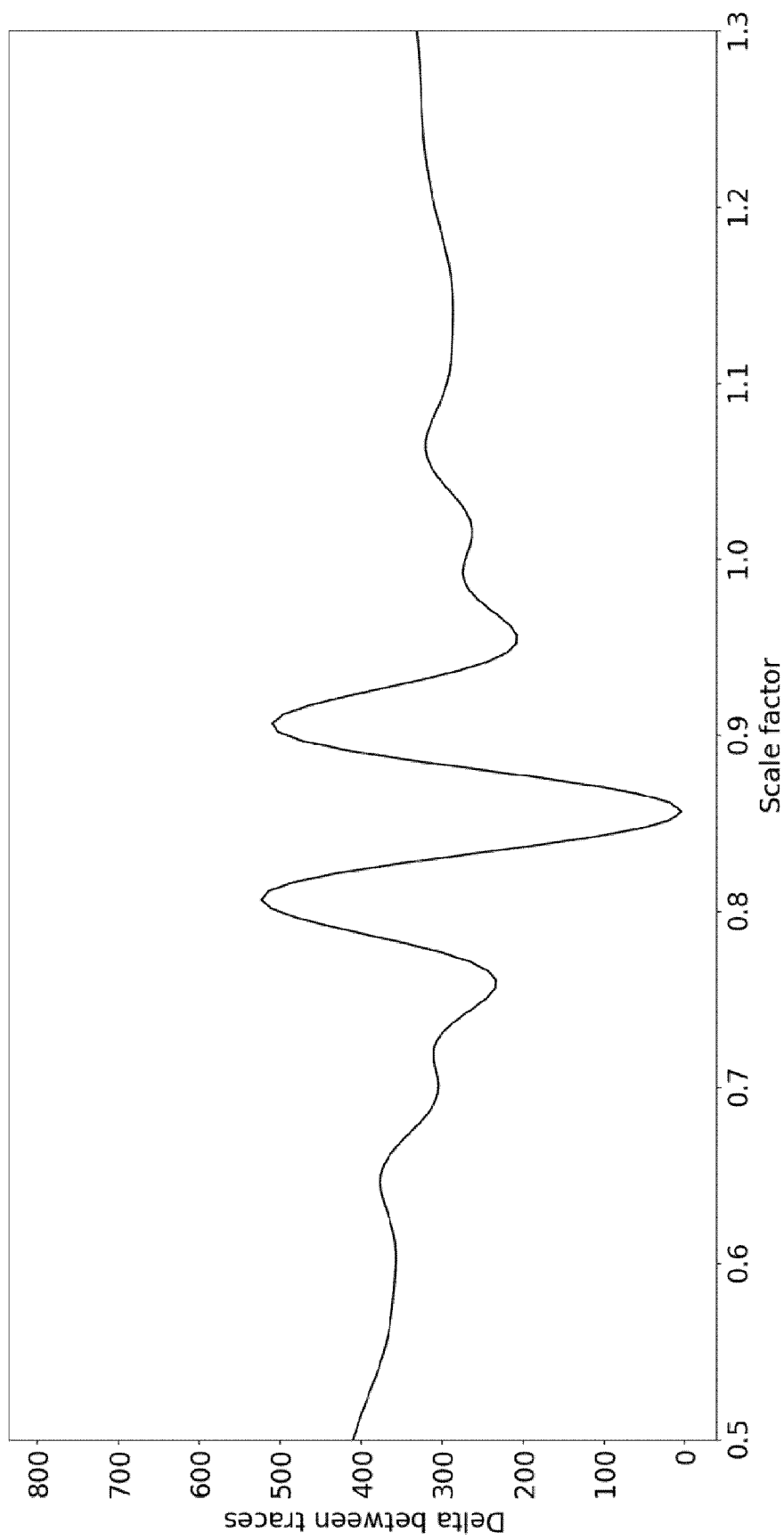
FIG. 6 shows a plot of the delta versus scale factor in an example of the invention.

FIG. 6 shows an example plot of the resulting delta plotted against the respective scale factor used. It can be seen that there is a minimum delta around scale factor=0.86 in this plot.

Note, steps 208 and 210 where a scaling (and interpolation) are performed can be done on the baseline trace instead, resulting in an adjusted baseline trace, which can in turn be compared to the original test trace.

Turning back to the flow chart, in step 212, the scale factor that results in the lowest delta $\Delta$ is identified. This can be done by generating a list of deltas which corresponds to a list of scale factors, and then finding the minimum value in the deltas list, and returning the corresponding scale factor that generated it. This resulting scale factor is indicative of the translation required to match the adjusted test trace with the baseline trace. A resulting scale factor of 1 indicates that there has not been a small loop change, whereas a scale factor of, for example, 1.02 may indicate a small lengthening of the line as the test trace has been squashed and has needed stretching to match it back to the existing baseline. Thus, an additional check can be made here to determine if the resulting scale factor is 1 or some small threshold either side of 1, such as 1.01, both of which could indicate that the loop length change is not significant to flag a potential loop length change. [Feiyu, is this last part correct?]

A scale factor >1 means that the test trace needed to be stretched to match the baseline trace. As tighter harmonics represent longer lines, this means that the test trace represents a longer line than the baseline and that the line has become longer.

A scale factor <1 compresses the trace, meaning that the test trace needed to be compressed to match the baseline trace. This means that the test trace represents a shorter line than the baseline and that the line has become shorter.

It should also be noted that tighter, more squashed harmonics also represent a lengthening of the line.

Figure 7:
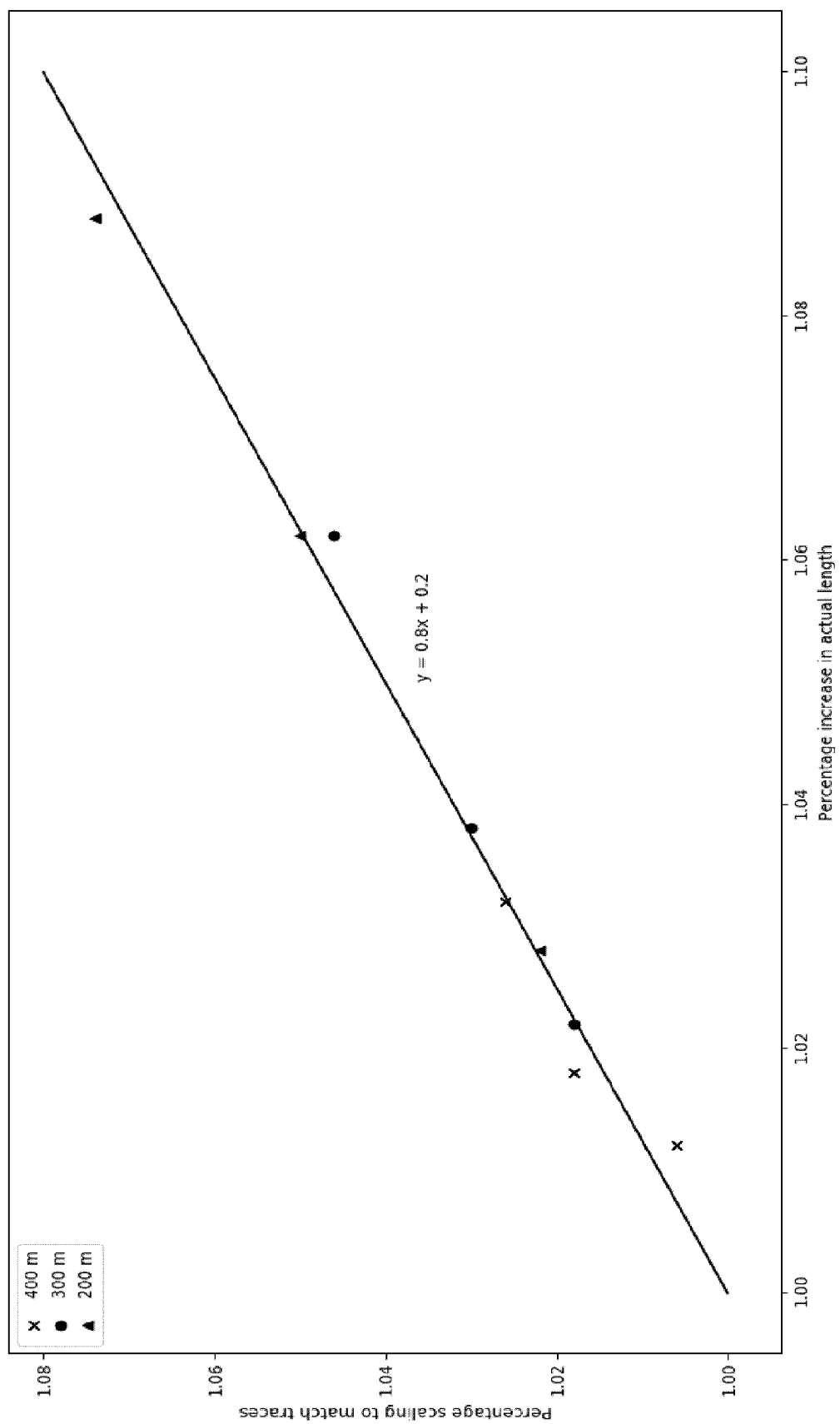
FIG. 7 shows a plot of scale factor versus percentage change in the line length observed experimentally.

The relationship between the scale factor and the actual percentage change in the line length is observed experimentally to be linear, as shown in FIG. 7. This linear relationship may then be used to convert a scale factor to an estimated percentage change in line length in step 214.

The percentage change can also be converted to an absolute change in metres, the percentage can be multiplied by a measure of the line length obtained from some other technique, such as from inventory data, frequency-domain reflectometry, or attenuation measurements.

Examples of the invention are realised, at least in part, by executable computer program code which may be embodied in an application program data. When such computer program code is loaded into the memory of the processor in the test module 124, it provides a computer program code structure which is capable of performing at least part of the methods in accordance with the above-described examples.

A person skilled in the art will appreciate that the computer program structure referred to can correspond to the flow chart shown in FIG. 2, where each step of the flow chart can correspond to at least one line of computer program code and that such, in combination with the processor in the test module 124, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of detecting a loop length change in a digital subscriber line, said method comprising:
   generating a test echo response from the digital subscriber line using a single ended line test, wherein said test echo response comprises a frequency domain trace;
   retrieving a historical echo response associated with the digital subscriber line, wherein the historical echo response comprises a frequency domain trace previously taken from the digital subscriber line;
   applying each of a plurality of scale factors to the frequency axis of the test echo response or to the frequency axis of the historical echo response to generate a corresponding plurality of adjusted test echo responses or adjusted historical echo responses respectively;
   calculating a difference between each of the adjusted test echo responses and the historical echo response or the adjusted historical test echo responses and the test echo response; and
   identifying the scale factor that resulted in the lowest calculated difference;
   comparing the identified scale factor to a threshold; and
   determining if there is a loop length change in dependence on the comparing step.

2. A method as claimed in claim 1 further comprises performing interpolation on the scaled test echo response or the scaled historical echo response to generate an adjusted test echo response or adjusted historical echo response, wherein the adjusted response test echo response or adjusted historical echo response comprises data points corresponding to the data points of the unscaled echo response.

3. A method as claimed in claim 1 further comprising determining an amount of the loop length change using the identified scale factor.

4. A method as claimed in claim 3, wherein the amount is a percentage change.

5. A method as claimed in claim 3, wherein the amount is a length change.

6. A test module for of detecting a loop length change in a digital subscriber line, said test module adapted in operation to:

obtain a test echo response from the digital subscriber line using a single ended line test, wherein said test echo response comprises a frequency domain trace;

retrieve a historical echo response associated with the digital subscriber line, wherein the historical echo response comprises a frequency domain trace previously taken from the digital subscriber line;

apply each of a plurality of scale factors to the frequency axis of the test echo response or to the frequency axis of the historical echo response to generate a corresponding plurality of adjusted test echo responses or adjusted historical echo responses respectively;

calculate a difference between each of the adjusted test echo responses and the historical echo response or the adjusted historical test echo responses and the test echo response; and identify the scale factor that resulted in the lowest calculated difference;

compare the identified scale factor to a threshold; and determine if there is a loop length change in dependence on the comparing step.

\* \* \* \* \*